No. 640,042. Patented Dec. 26, 1899.
H. C. & W. B. STALDER.
TRUCK FRAME.
(Application filed Sept. 1, 1899.)

(No Model.) 2 Sheets—Sheet 1.

Witnesses
T. L. Mockabee
Edwin King Lindsey

Inventors
H. C. & W. B. Stalder
by G. R. Brock
Attorney

THE NORRIS PETERS CO., PHOTO-LITHO., WASHINGTON, D. C.

No. 640,042. Patented Dec. 26, 1899.
H. C. & W. B. STALDER.
TRUCK FRAME.
(Application filed Sept. 1, 1899.)
(No Model.) 2 Sheets—Sheet 2.
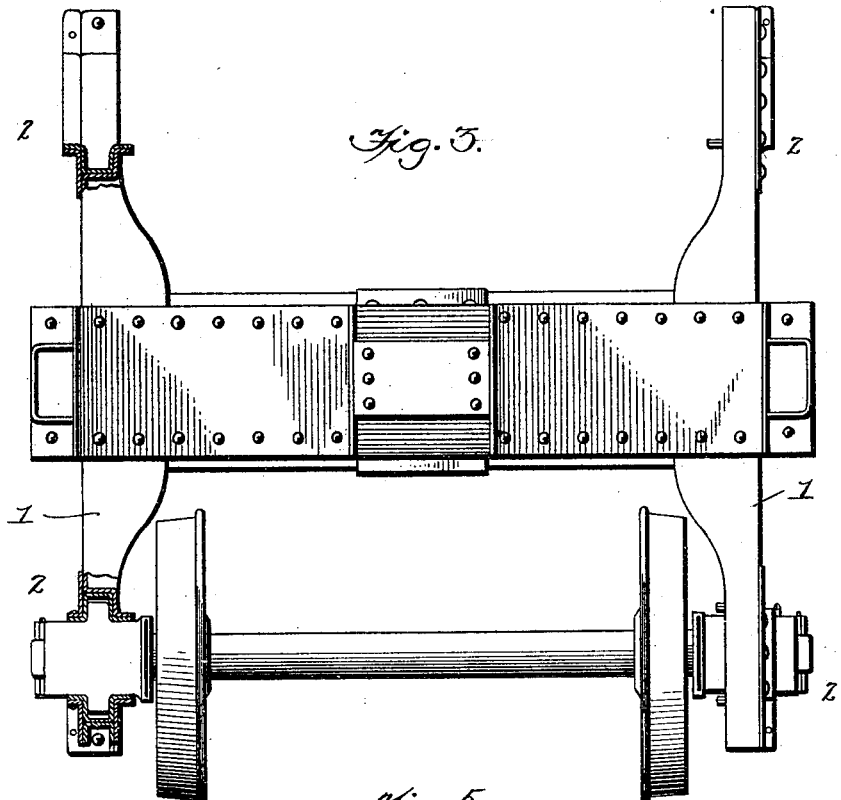
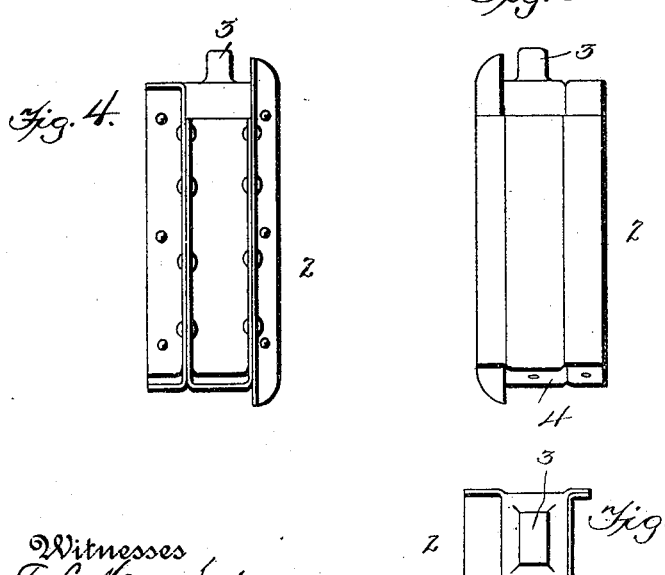
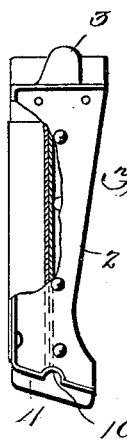
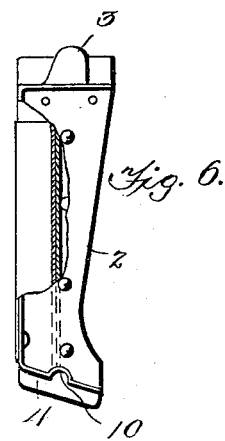
Witnesses
T. L. McCabe
Edwin King Lundy
Inventors
H. C. & W. B. Stalder,
by F. D. Brock
Attorney

United States Patent Office.

HARRY C. STALDER AND WIRT B. STALDER, OF PORTSMOUTH, OHIO, ASSIGNORS OF ONE-HALF TO LEVI D. YORK, OF SAME PLACE.

TRUCK-FRAME.

SPECIFICATION forming part of Letters Patent No. 640,042, dated December 26, 1899.

Application filed September 1, 1899. Serial No. 729,242. (No model.)

*To all whom it may concern:*

Be it known that we, HARRY C. STALDER and WIRT B. STALDER, citizens of the United States, residing at Portsmouth, in the county of Scioto and State of Ohio, have invented a new and useful Improvement in Truck-Frames; and we do declare the following to be a full, clear, and exact description of the invention, such as will enable others skilled in the art to which it appertains to make and use the same, reference being had to the figures on the accompanying drawings, which form a part of this specification.

Our invention relates to truck-frames.

The object of the invention is to produce a steel-pressed truck-frame having hereinafter-cited advantages of construction, the details of which will first be fully described and the features of novelty then set forth and claimed.

Figure 1:
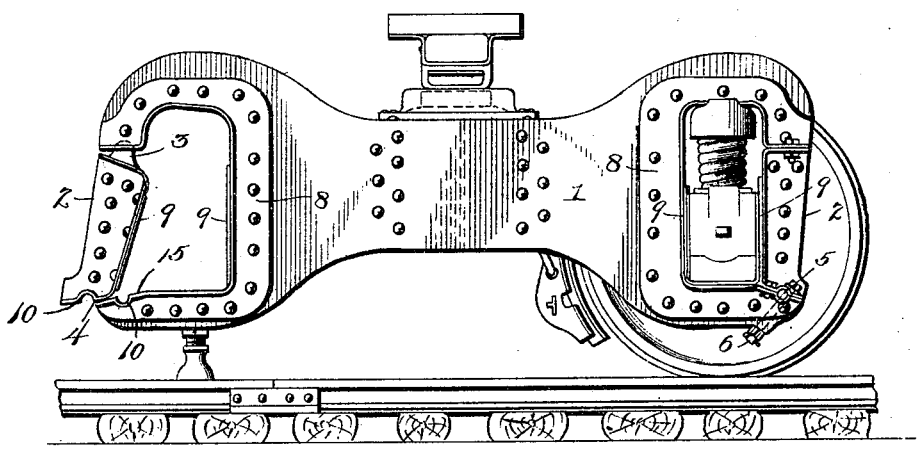
Figure 8:
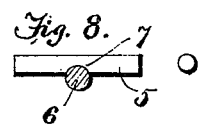
Figure 2:
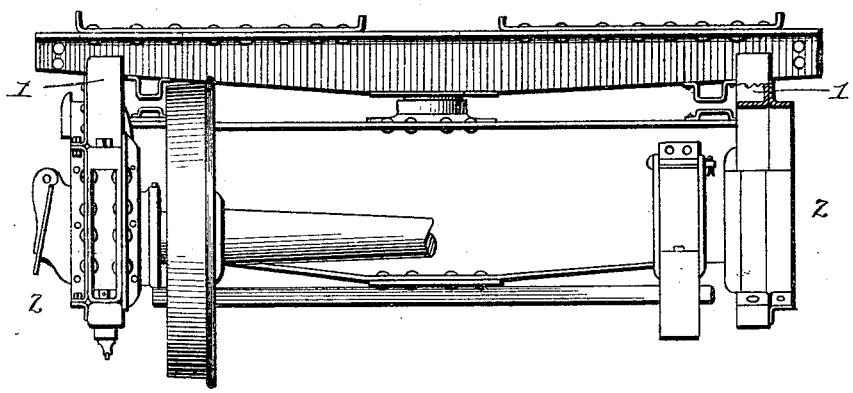

Figure 1 represents a side elevation of a truck-frame, showing our improvements applied thereto. Fig. 2 is an end elevation of the same, both Figs. 1 and 2 having certain parts broken away or omitted for purposes of perspicuity. Fig. 3 is a plan view of the truck-frame, partly in section. Figs. 4, 5, 6, and 7 are various elevations of the removable pedestal-jaw, which will hereinafter be more particularly referred to. Fig. 8 is a detail side elevation and end view of the safety-pin connection.

In solid pressed-steel truck-frames it is very desirable to be able to use in connection therewith the old standard Master Car-Builders' oil-boxes and bearings, such as are used, for instance, with the old wooden bolster, and adapt the same to steel-pressed truck-frames.

1 represents a solid steel-pressed truck-frame rigidly united with outer removable pedestal-jaws 2, so that the ordinary oil-boxes, bearings, and springs may be readily inserted and removed from the truck-frame. This removable pedestal-jaw 2 is provided with a lug 3, substantially as shown, which takes into a corresponding depression in the upper end of the frame 1. The lower end of the jaw 2 is provided with an inclined face 4 in alinement with the inclined face 15 on the lower portion of the frame 1, so that the lug 3 may be first inserted in the frame and the jaw pushed home or into place, as clearly shown in the drawings. When the jaw 2 is in place, the pin 5 is pushed in between the inclined meeting faces 4 and 15 to hold the jaw securely in place. An inclined bolt 6 is then passed through an aperture in the lower flange of the pedestal-jaw 2 and through the lower portion of the frame 1, which bolt firmly and rigidly unites the jaw 2 to the frame or pedestal. The pin 5 is recessed or grooved at 7, as clearly shown, and the inclined locking-bolt 6 rests in said groove 7, thereby interlocking both pin and bolt together and making it impossible to remove the pedestal-jaw. This safety-pin 5, it will be seen, cannot be removed until after the bolt 6 is first taken out or removed. Should the inclined bolt become loose, the pedestal-jaw 2 would still remain in position until the safety-pin 5 was removed. The lower end of jaw 2 and the lower end of the pedestal-frame have each semicircular recesses 10 to receive the safety-pin 5.

The pedestal-jaws 2 and 8 form a guide for the bearings and oil-boxes to operate in. By this construction we are also enabled to use steel liner-plates 9 upon both pedestal-jaws and to remove and replace the same when worn and out of adjustment.

The outside pedestal-jaws 2 are constructed of three separate pieces of pressed steel riveted together, and the lugs or blocks 3 upon their upper ends are rigidly bolted to the jaw. It will be noted that the angle of the lower end of the lower jaw 2 is such that with the slightest assistance its own weight will force it outwardly. It is therefore so simple and operates so easily that a set of wheels can be replaced in a truck in a very short time. It is also desirable to arrange the bolt 6, uniting the pedestal-jaw with the lower end of the pedestal-frame, at the angle shown clearly by the drawings, as any strain put upon the removable pedestal-jaw is exerted in direct line with the bolt, the latter being thus prevented from being sheared off.

What we claim as new, and desire to secure by Letters Patent, is—

1. The combination, in a truck-frame, of a pedestal having rigid inner, upper and lower walls, an outer removable pedestal-jaw having locking mechanism at its upper and lower ends, the upper end of the removable pedestal-jaw and the upper wall of the pedestal being formed with a corresponding lug and depression, and the lower end of said removable jaw and the lower wall of the pedestal being formed with corresponding downwardly-inclined faces, substantially as described, whereby when the lower locking mechanism is removed, the removable jaw has a tendency to swing outwardly.

2. The combination of a rigid pedestal-frame having a lower wall formed with a downwardly-inclined face, and a pin-receiving depression formed therein, a removable pedestal-jaw having engaging mechanism at its upper end, a downwardly-inclined face at its lower end having a pin-receiving depression in said face corresponding to that in the pedestal, and a pin adapted to register in said depressions, substantially as set forth.

3. In a truck-frame, the combination of a pedestal, a removable pedestal-jaw, a longitudinally-inclined bolt and a transverse pin uniting the pedestal and the removable pedestal-jaw, said bolt and pin having interlocking contact, substantially as described.

4. In a truck-frame, the combination of a pedestal having rigid inner, upper and lower walls, an outer removable pedestal-jaw having locking mechanism at its upper and lower ends, the upper end of the removable pedestal-jaw and the upper wall of the pedestal being formed with a corresponding lug and depression, and the lower end of said removable jaw and the lower wall of the pedestal being formed with corresponding downwardly-inclined faces, and a longitudinally-inclined bolt uniting said inclined faces, whereby the tendency of the bolt to be sheared off by transverse strains is obviated.

In testimony whereof we have affixed our signatures in the presence of two witnesses.

HARRY C. STALDER.
WIRT B. STALDER.

Witnesses:
JOHN R. HUGHES,
R. A. CALVERT.